United States Patent [19]

Reynolds

[11] Patent Number: 5,049,017

[45] Date of Patent: Sep. 17, 1991

[54] LAMINATED NUT WITH ANTI-SPIN OFF STRUCTURE AND METHOD OF MAKING NUT

[75] Inventor: Richard L. Reynolds, Grosse Pointe Shores, Mich.

[73] Assignee: Pac Fasteners, Southfield, Mich.

[21] Appl. No.: 526,054

[22] Filed: May 21, 1990

[51] Int. Cl.⁵ .............................................. F16B 37/08
[52] U.S. Cl. .................................... 411/432; 411/222
[58] Field of Search ............... 411/366, 432, 427, 222, 411/259, 103, 937, 937.1, 285, 266, 267, 223, 226

[56] References Cited

U.S. PATENT DOCUMENTS

| | | | |
|---|---|---|---|
| 375,294 | 12/1887 | Johns | 411/222 |
| 2,382,748 | 8/1945 | Schuttler | 411/432 |
| 3,233,262 | 2/1966 | Vollman | 411/432 X |
| 4,383,787 | 5/1983 | Reynolds | 411/432 X |
| 4,900,209 | 2/1990 | Reynolds | 411/432 |
| 4,930,962 | 6/1990 | Reynolds | 411/389 X |
| 4,940,377 | 7/1990 | Reynolds | 411/259 X |

FOREIGN PATENT DOCUMENTS

| | | | |
|---|---|---|---|
| 641184 | 1/1979 | U.S.S.R. | 411/223 |
| 328783 | 5/1930 | United Kingdom | 411/223 |

Primary Examiner—Rodney M. Lindsey
Attorney, Agent, or Firm—Harness, Dickey & Pierce

[57] ABSTRACT

A laminated nut structure and method of making same with the nut structure having a plurality of coned disc washers having a common threaded bore with the disc washers being held in a cage having fingers gripping the disc washers with at least one of the disc washers being of a deformable material and the others being of a hard material with the threads in the portion of the bore defined by the one disc washer being deformed to provide a prevailing torque characteristic with the thread of an associated bolt portion and with at least one of the cage fingers having an opening in line with the one of the disc washers whereby it can be engaged by a tool to deform the thread at that location.

24 Claims, 2 Drawing Sheets

U.S. Patent      Sep. 17, 1991      Sheet 1 of 2      5,049,017
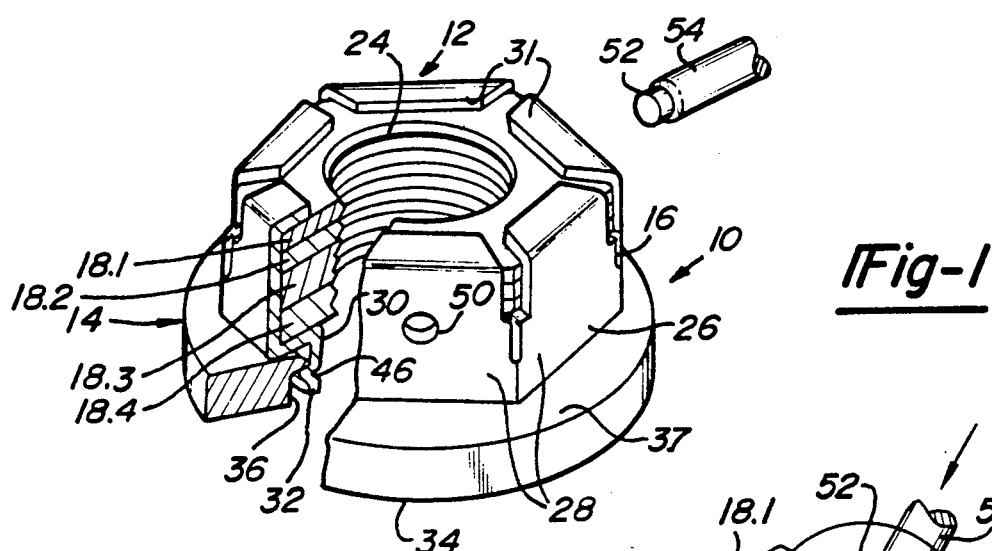
Fig-1
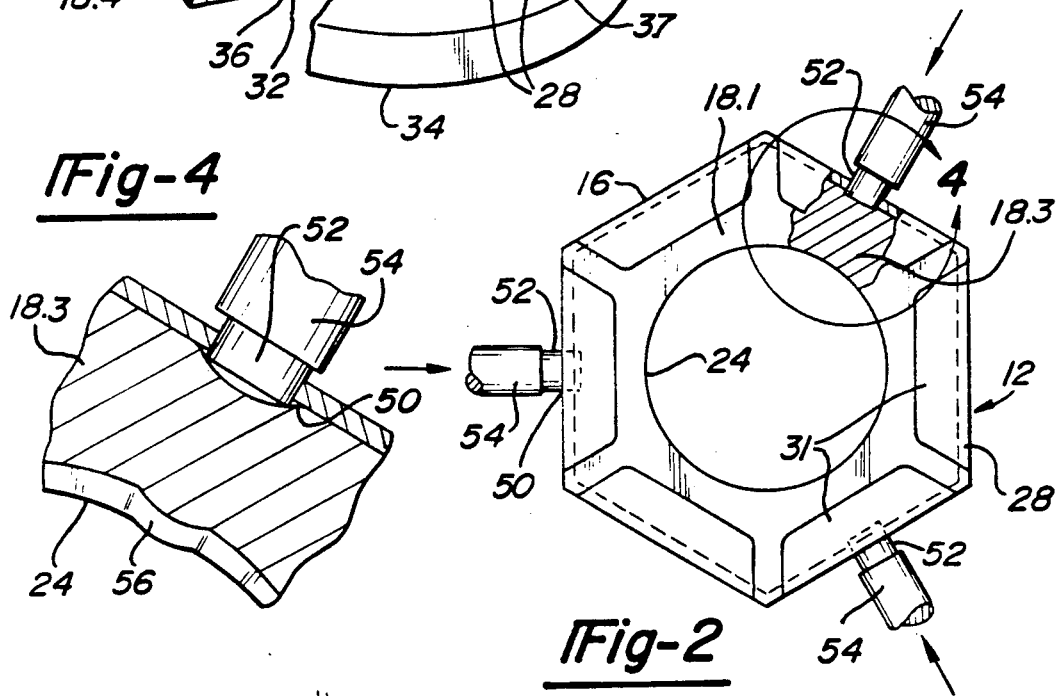
Fig-4
Fig-2
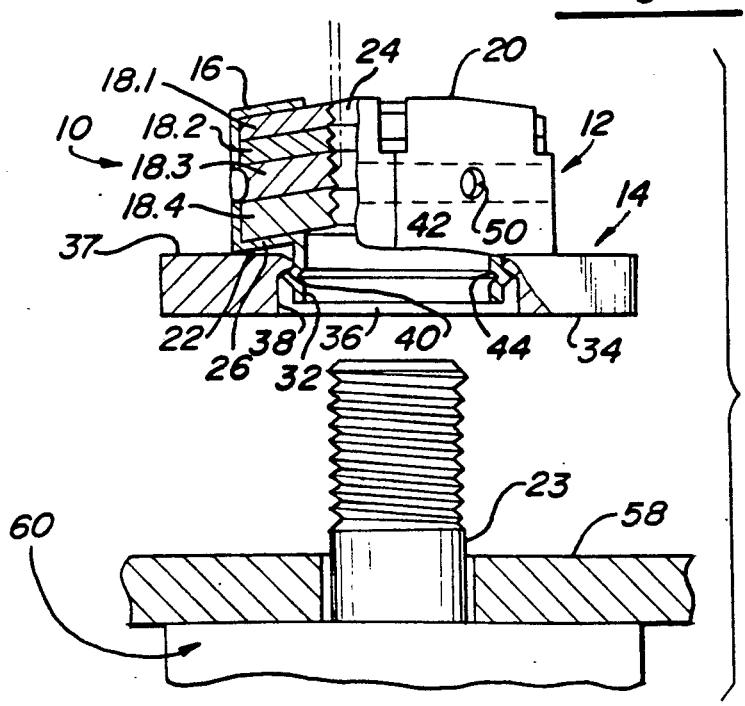
Fig-3

LAMINATED NUT WITH ANTI-SPIN OFF STRUCTURE AND METHOD OF MAKING NUT

SUMMARY BACKGROUND OF THE INVENTION

The present invention relates to laminated nuts utilizing laminations of hex shaped, coned-disc springs, having a central opening tapped to match threads on an associated bolt and more specifically to a laminated nut having an anti-spin off structure and a method for making such nut and is a continuation in part of U.S. patent application of Richard L. Reynolds Ser. No. 388,658, filed Aug. 2, 1989 now U.S. Pat. No. 4,940,377 for Laminated Nut Having Cage With Nested Fingers and Method of Manufacture and the disclosure thereof is incorporated herein by reference.

Laminated nuts have stacked, aligned multiple discs retained by a steel outer cage which can be hex shaped and having six fingers. Examples of such laminated nut structures are shown and described in U.S. Pat. No. 4,383,787, issued to Reynolds on May 17, 1983. Another type with only two fingers which are in a nested construction is shown in my noted copending patent application Ser. No. 388,658.

The above noted laminated nuts are free running on the bolt until seated in clamping workpieces together. A locking force between the nut and bolt results from the application of additional torque and rotation after initial seating. The additional torque compresses and partially flattens the conical spring discs whereby a mechanical interference occurs between the thread flanks of the nut and bolt; it is believed that this is at least partially due to a change in hole size of the nut as the conical discs flatten. The resultant thread interference and retained spring load between thread flanks resists unloading that might otherwise occur as a result of tensile or vibrational loads. Thus, the independently loaded conical spring threaded segments when flattened create a thread interference that tends to lock the nut against rotation or loosening when subject to such loads.

It is conventional to utilize discs which are hardened whereby permanent deformation is resisted. In some instances one of the discs is constructed of a non-hardened material. Upon final installation in clamping the workpieces together the soft disc is permanently deformed causing a thread inference; thus when the nut is reverse torqued the interference remains creating a prevailing torque characteristic. Until such deformation, however, the nut is free running and can be readily spun onto the associated bolt.

At the same time, however, unless the nut is torqued to clamp the workpieces to a selected magnitude, the locking action is not implemented and/or the deformation causing the prevailing torque characteristic does not occur. Here the free running nut could, if not properly loaded, back off from the bolt. Thus in some applications it is desirable that the laminated nut provide a prevailing torque even for the initial application onto the bolt; in these situations the nut would not be free running. Thus in the event the operator fails to fully torque the nut onto the bolt to create the lock and/or the prevailing torque deformation, the nut will still have a prevailing torque feature resisting removal and hence resisting loosening and/or backing off from the bolt through vibration.

In the present invention a unique laminated nut construction is provided having a soft disc interspersed with a plurality of hard discs with the soft disc designed to provide the prevailing torque feature after deformation from final torquing. In addition, however, the soft disc is initially predeformed at a plurality of locations to provide a preselected interference with the mating thread of the bolt; this initial interference will provide resistance to torquing on but will also provide resistance to backing off in the event the nut has not been properly torqued on. The result will be a prevailing torque characteristic which will resist backing off in the event the nut has not been adequately tightened on the bolt to properly clamp the workpieces. The pre-deformed or initial magnitude of prevailing torque is selected to be relatively small compared to the magnitude of the final prevailing torque such that initial installation torque loads in running the nut onto the bolt can be minimized.

The cage can be formed with a cup portion and a plurality of fingers that engage the discs to hold them in alignment. In the present invention openings are provided in the fingers in line with the soft disc such that the soft disc can be accessed by a plurality of punches; in this way the soft disc can be struck at a plurality of positions to deform the threaded opening to provide interference with the threaded bolt resulting in the desired initial magnitude of prevailing torque. The nut is heat treated after assembly and after thread formation; it appears that, as a side benefit, the presence of the openings in the cage fingers permits a more uniform exposure to the heating atmosphere resulting in a better, more uniform heat treat of the discs to be hardened. It is believed that this effect is most beneficial with the hex shaped cage of the type shown in the noted '787 patent.

It appears desirable to deform the soft disc or washer through openings in fingers even with the nested, two finger cage construction of the referenced ,658 patent application. When the soft disc is deformed at sides which have no fingers there is a tendency for the discs to separate axially disturbing the continuity of the threads in the threaded bore. This can result in high friction and galling of the associated bolt. Such axial separation is avoided when the deformation is made through openings in the fingers; in this regard it appears that the fingers act locally to axially clamp the discs together and hence inhibit axial separation.

Therefore, it is an object of the present invention to provide an improved laminated nut structure having a plurality of hardened discs and a soft disc with the soft disc having its thread form distorted prior to installation of the nut on the bolt to provide an initial prevailing torque characteristic with the associated bolt.

It is another object to provide an improved laminated nut having a cage with a plurality of retaining fingers with the fingers having openings in the areas of a soft disc to permit access for upsetting the soft disc whereby the noted thread interference for the initial prevailing torque characteristic can be provided.

It is another object to provide an improved laminated nut structure having a plurality of hardened discs and a soft disc with the threads of the soft disc deformed to provide an initial magnitude of prevailing torque as it is applied to an associated bolt and to provide a final magnitude of prevailing torque as it is again distorted by the application of the final magnitude of torque in clamping workpieces together.

It an object of the present invention to provide a unique laminated nut structure.

It is still another object to provide a unique method of making a laminated nut having a novel prevailing torque characteristic.

Other objects, features, and advantages of the present invention will become apparent from the subsequent description and the appended claims, taken in conjunction with the accompanying drawings, in which:

FIG. 1 is a pictorial view of one form of a laminated nut structure with a hex shaped cage and a washer connected as a single assembly and embodying features of the present invention, with some parts shown broken away;

FIG. 2 is a top elevational view of the laminated nut structure of FIG. 1 before assembly with the washer and with some parts broken away and shown with a plurality of punches for distorting the thread in one of the discs to provide an initial prevailing torque characteristic;

FIG. 3 is a side elevational sectional view of the nut structure and washer assembly of FIG. 1, taken generally in the direction of the Arrows 3—3 in FIG. 1 and shown in preassembled relationship to a pair of workpieces including a spindle combination;

Figure 5:
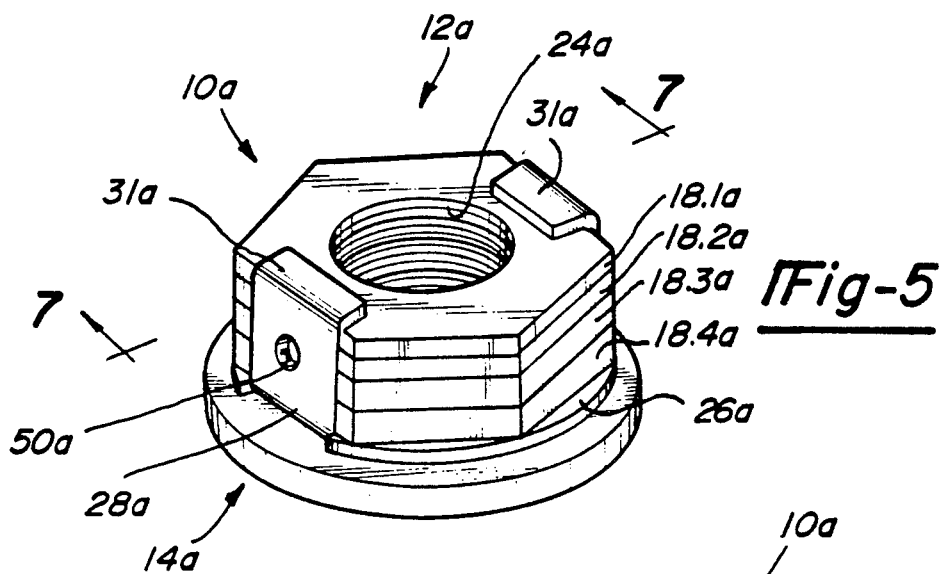
Figure 6:
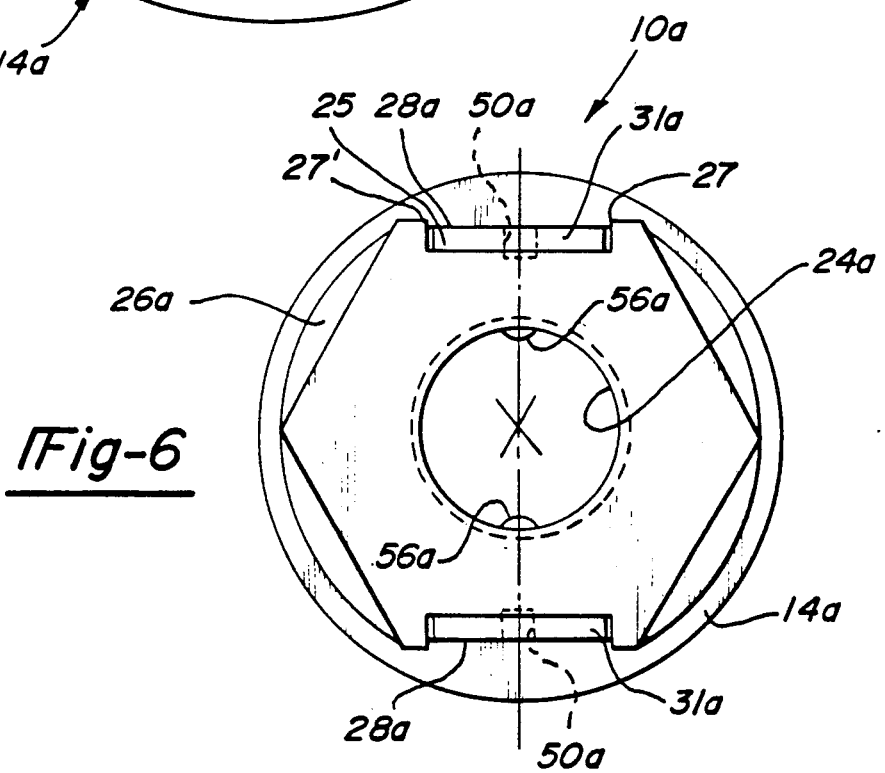

FIG. 4 is a sectional view to enlarged scale taken generally of the portion of the assembly in the Circle 4 in FIG. 2 and illustrating the initially distorted thread form in one of the discs of the nut structure FIG. 5 is a pictorial view of a different form of a laminated nut structure with a cage having only a pair of fingers which are adapted to be nested within slots on opposite sides of the flats of the stacked discs and including a washer connected as a single assembly;

FIG. 6 is a top elevational view of the nut and washer assembly of FIG. 5; and

Figure 7:
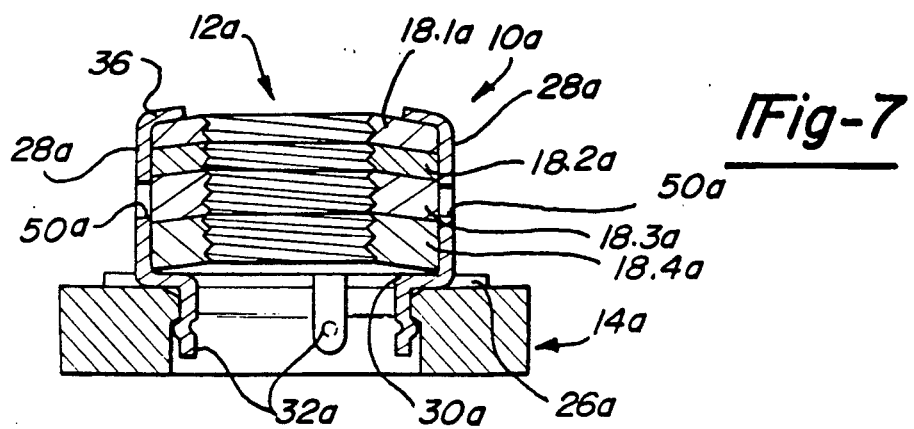

FIG. 7 is a sectional view of the nut and washer assembly of FIG. 5 taken generally in the direction of the Arrows 7—7 in FIG. 5.

DETAILED DESCRIPTION

In one form of the present invention the laminated nut is shown in an assembly with a washer member; such a combination is shown in U.S. Pat. No. 4,900,209, issued Feb. 13, 1990 to Reynolds for Nut and Washer Single Assembly Structure. The combination disclosed and claimed therein, however, while useful with the present invention does not comprise a necessary part of the present invention.

Looking now to FIGS. 1 and 3 of the drawings, a nut and washer assembly 10 is shown and includes a laminated nut structure 12 and a washer 14. The nut structure 12 is of a laminated construction generally of the type shown in the '787 Reynolds patent (supra). As such the nut structure 12 is constructed of a series of hex shaped coned, disc springs 18.1-18.4 which are held in an assembled, stacked relationship via an outer cage 16. Thus the laminated nut structure 12 can be considered to be constructed of a nut member defined by the disc springs 18.1-18.4 and the outer cage 16. The laminated nut structure 12 has a top side 20 and a bottom side 22 (see FIG. 3). In order to secure the desired locking feature between nut and bolt, the nut structure 12 should be mounted on its associated stud or bolt such as stud portion 23 with the bottom side 22, including the washer 14, being the leading end of the nut structure 12, and hence of the nut and washer assembly 10, as it is threaded onto the bolt or stud portion 23. The laminations or disc springs 18.1-18.4 define a central bore 24 which is threaded to be matably, threadably received upon the bolt or stud portion 23. Thus when properly installed, the laminations or disc springs 18.1-18.4 are initially dished centrally outwardly from the bolt or stud portion 23 or axially outwardly from the bottom side 22 towards the top side 20.

The cage 16 can be formed of sheet metal and includes an annular bottom ring or cup portion 26 and a plurality of axially extending fingers 28. In one form of the invention the cage was constructed of a hardenable steel such as an AISI 1050 or AISI 1070 spring steel having a Rockwell hardness of between around Rc 39 and Rc 45. The cage 16 can be formed by initially blanking from a thin, flat sheet having a thickness of around 0.04".

In the form of the invention shown, six fingers 28 are circumferentially arranged in a hexagonal pattern around the periphery of the cup portion 26 with each engaging a corresponding flat of the hexagonally shaped outer surface of the laminations or disc springs 18.1-18.4. The outer end portions 31 of the fingers 28 are folded radially inwardly to grip the uppermost disc spring 18 1 and to axially clamp the disc springs 18.1-18.4 together. Also the bottom surface of the ring portion 26 can be dished axially inwardly to generally conform to the dished contour of the lowermost disc spring 18.4. The ring portion 26 has a central, generally circular opening 30 which when the cage 16 is secured to the laminations or disc springs 18.1-18.4 will be generally concentric with the threaded central bore 24.

The outer cage 16 is provided with a plurality of tabs 32 extending axially from the opening 30 at the bottom side 22 of the cage 16. Three equally circumferentially spaced tabs 32 are provided at alternate corners of the hex shape defined by the outer cage 16. The tabs 32 are of a limited circumferential extent to facilitate formation during the blanking and bending in the construction of the cage 16. In addition the tabs 32 are circumferentially limited to permit flexibility for assembly to the washer 14. This limited circumferential length of each of the tabs 32 is preferably less than around one half of the circumferential length of the associated one of the flat sides of the cage 16 (see the Reynolds '209 patent supra).

The washer 14 is generally flat with a generally circular shape. The washer 14 has a workpiece engaging surface 34 which has a substantially larger load bearing area than that of the bottom surface of ring portion 26. Washer 14 has a central bore 36 which is larger than the threaded nut bore 24. The washer bore 36 has a counterbore 38 at its engaging surface 34 end which defines an annular generally radially flat ledge or shelf 40. At the opposite or upper side surface 37 of the washer 14, the washer bore 36 is provided with a lead in chamfer 42 which connects to an intermediate, reduced diameter bore portion 44.

Each of the tabs 32 is provided with a radially outwardly extending locking protrusion 46. The protrusion 46 can be formed by dimpling during the blanking of the material for the cage 16. The radial outer extent of each of the protrusions 46 together define a diameter which is greater than the diameter of reduced diameter bore portion 44 but less than the diameter of counterbore 38.

Thus in assembling the nut structure 12 and washer 14, the tabs 32 are axially moved into the washer bore 36. The protrusions 46 engage the chamfer 42 which facilitates moving the tabs 32 axially and resiliently deflecting them radially inwardly until the protrusions 46 are axially moved past the reduced diameter bore portion 44 and into alignment with the counterbore 38. In this location the resilient tabs 32 spring radially outwardly towards their original positions with the protrusions 46 now caught in the counterbore 38.

Note that the axial length of the tabs 32 is selected relative to the thickness or width of the washer 14 such that the axial outer extremity of the tabs 32 will not extend beyond the workpiece engaging surface 34 of the washer 14. As assembled with the nut structure 12, the washer 14 has its washer bore 36 (including counterbore 38) in slight radial and axial clearance with the confronting surfaces of the cage tabs 32 and protrusions 46. This construction facilitates free spinning of the nut structure 12 relative to the washer 14 while maintaining the washer bore 36 substantially concentric with the threaded nut bore 24. At the same time the washer bore 36 is held away from engagement with the thread surface of the associated bolt or stud portion 23. The upper surface 37 of washer 14 is generally flat and provides a well defined or generally flat surface facilitating the partial collapsing of the disc springs 18.1-18.4 whereby the previously noted torque retention and prevailing torque characteristic can be obtained.

With the assembly as shown and described, the nut structure 12 including the cage 16 and spring discs 18.1-18.4 can be preassembled and the nut bore 24 tapped to provide the desired thread form prior to heat-treat. The coned discs 18.1, 18.2 and 18.4 are constructed of a thermally hardenable ferrous material such as an AISI 1050 or AISI 1070 spring steel or other hardenable material such as a 300 series, A286 or 17-7 PH stainless steel. The coned disc 18.3, however is constructed of a relatively low carbon steel such as an AISI 1008 to around AISI 1018 which is not susceptible to thermal hardening.

Each of the fingers 28 is provided with an opening 50 located in alignment with the soft disc 18.3. The openings 50 are selected to be of a size to permit access by the point 52 of a punch 54 (see FIGS. 2 and 3). Thus after the bore 24 of the nut structure 12 has been tapped the soft disc 18.3 can be struck by a plurality of punches 54 through openings 50 to permanently deform radially inwardly that portion of bore 24 defined by soft disc 18.3. This will create a distortion in the thread in soft disc 18.3 to provide an initial preselected interference with the threads of the associated bolt or stud portion 23 upon which the nut and washer assembly 10 is to be installed. FIG. 4 illustrates one of the locally distorted thread portions 56 in disc 18.3. Since the nut structure 12 is in the form of a hex nut the use of three punches 54 at alternate ones of the openings 50 will result in three distorted thread portions 56 which will effectively provide the desired interference. In this regard the outer end portions 31 of the fingers 28 clamp the disc springs 18.1-18.4 against the cup portion 26 to preclude axial separation of the disc springs and axial distortion of the threads of the threaded bore 24 during the punching operation.

Next the nut structure 12 can be heat treated with the hardenable cone discs 18.1, 18.2 and 18.4 being hardened to a Rockwell hardness of between around Rc39 to around Rc45. The soft disc 18.3 will be substantially non-hardened and have a Rockwell hardness of around Rb 125 or less.

In prior constructions, where a soft disc has been used to provide a prevailing torque characteristic resulting from loading to the final assembly torque, the soft disc has been located between two hardened discs. In the present invention, this location serves a purpose beneficial to the provision of the initial prevailing torque characteristic. With such a construction the thread distortion in the soft disc 18.3 is located axially away from the leading end of the nut structure 12. Thus at least two full threads of the nut structure 12 will be engaged with the associated bolt or stud portion 23 before the distorted thread portions 56 of the soft disc 18.3 come into engagement. This facilitates the threaded start of the nut structure 12 onto the associated bolt or stud portion 23 without misalignment and possible stripping. Also by providing the distorted thread portions 56 and initial prevailing torque characteristic in a soft disc 18.3, galling and/or other damage to the threads of the associated bolt or stud portion 23 will be inhibited; in this regard the bolt or stud portion 23 would be harder than the soft disc 18.3, having a hardness greater than or generally the same as that of the hardened discs 18.1, 18.2 and 18.4. By contrast the use of such a distorted thread portion in a hardened disc could result in damage to the threads of the associated bolt and in this regard could also reduce the resultant prevailing torque obtained by deflection and/or permanent deformation of the soft disc 18.3 after final torque down.

The openings 50 can be of a minimal size to permit access by the points 52 of punch 54 while not significantly affecting the strength of the associated fingers 28. Thus in one structure where the diameter of bore 24 was around ¾" and the circumferential width of the flats of the fingers 28 and/or discs 18.1-18.4 was around ¾", openings 50 of a diameter of around 0.20" or around the thickness of the soft disc 18.3 were provided. As noted with the openings 50 in the fingers 28 the effectiveness of the heat treatment of discs 18.1, 18.2 and 18.4 appeared improved resulting in a more uniform hardness of these hardenable discs.

Note that the initial distortion of the soft disc 18.3 was provided while the nut structure 12 was separate from the washer 14. Since the hardness of the disc 18.3 will be substantially unaltered by heat treating, the initial distortion via punches 54 can be provided before or after heat treat and also before or after assembly of the nut structure 12 onto the washer 14. In any event, the washer 14 will be separately heat-treated and any final coat, finish, etc. can be applied as desired. The finished, heat treated preassembly of nut structure 12 can be readily assembled to the finished, heat treated washer 14 with the members connected such that the washer 14 is free spinning relative to the nut structure 12. In some cases, depending on the relative and/or total masses of the components, the nut structure 12 and washer 14 can be heat treated as an assembly.

Now the nut and washer assembly 10 can be applied to a threaded bolt or stud portion 23 to secure a plurality of workpieces together. As shown in FIG. 3 the workpieces can comprise a workpiece 58 and a spindle 60 with the stud portion 23 being a part of the spindle 60. Of course, a separate bolt could be utilized to similarly clamp a plurality of workpieces of varying constructions.

The initial prevailing torque feature is selected to be of a sufficient magnitude to resist backing off from vibration in the event the nut and washer assembly 10 is improperly installed and not fully torqued onto the bolt or stud portion 23. In one form of the invention the initial prevailing torque characteristic provided a resistance to removal which was around 40% of the magnitude provided by the final prevailing torque characteristic.

As noted when properly installed, the washers 18.1-18.4 will partially collapse to provide a high torque retention resisting reverse rotation. At the same time the soft disc 18.3 will be permanently deformed to distort its thread form such that on removal the final prevailing torque characteristic of desired magnitude will remain to resist backing off. Because the disc 18.3 is soft, it is readily deformed such that the initial distortion is effectively reformed with the result that the final prevailing torque will attain substantially the same magnitude as if the initial distortion had not occurred. In this regard the soft disc 18.3 can provide the desired initial prevailing torque on relatively long thread runs on the associated bolt without thread galling.

It should be noted that in some applications it may be desirable to provide thread distortion in a disc, such as disc 18.3, which is of a relatively hard or thermally hardenable material resulting in a higher magnitude of deprevailing torque. Thus in another form of the present invention the distorted disc, such as disc 18.3, would have a final hardness less than around 39 Rc to around 45 Rc (the hardness of the other discs 18.1, 18.2 and 18.4) but substantially higher than Rb 125.

Thus the result of the preceding is an improved laminated nut structure having an initial prevailing torque characteristic to resist removal in the event of an improper, not fully torqued, installation while still providing a high magnitude of final prevailing torque where the fastener is properly installed.

Another form of the present invention is shown in the embodiment of FIGS. 5-7 with components similar to like components in the embodiment of FIGS. 1-4 are given the same numeral designation with the addition of the letter postscript "a". Looking now FIGS. 5-7, a laminated nut and washer assembly 10a, is shown and includes a laminated nut structure 12a and a washer 14a. The nut structure 12a includes a series of hex shaped hardened coned, disc springs 18.1a-18.4a which are held in an assembled, stacked relationship via a cage 16a. The laminated nut 12a has a top side 20a and a bottom side 22a. As noted, the nut 12a should be mounted onto the associated bolt with the bottom side 22a being the leading end of the nut 12a as it is threaded onto the bolt and hence with the top side 20a being the trailing end. As shown in FIGS. 5-7, the laminations or springs 18.1a-18.4a define a central bore 24a which is threaded to be matably, threadably received upon the bolt.

The cage 16a can be formed of sheet metal and includes a bottom ring portion 26a and a plurality of axially extending fingers 28a. In a preferred form of the invention two such fingers 28a are utilized as shown. The cage 16a has a clearance opening 30a in line with and larger than threaded bore 24a to permit easy passage of the associated bolt. In one form of the invention both the cage 16a and disc springs 18.1a-18.2a and 18.4a were constructed of an AISI 1050 or AISI 1070 spring steel and hardened to a Rockwell hardness of between around Rc 39 and Rc 45. The disc 18.3a can be formed of a material similarly to that of disc 18.3 as described above.

In the form of the invention shown in FIGS. 5-7, two axially extending fingers 28a are circumferentially arranged on diametrically opposite sides of the ring portion 26a with each being in line with two corresponding diametrically opposite flats of the hexagonally shaped outer surfaces of the laminations or disc springs 18.1a-18.4a. Each of the disc springs 18.1a-18.4a has its two opposite flats grooved or slotted which, when assembled, define two continuous axially extending slots 25. The radial depth of the slots 25 is greater than the thickness of the fingers 28a such that the fingers 28a will be nested or located substantially completely in the slots 25. The outer end portions 31a of the fingers 28a are folded radially inwardly to define retaining tabs which grip the uppermost disc spring 18.1a and thereby axially clamp the components, including disc springs 18.1a-18.4a, together.

Note that the fingers 28a are completely nested within the associated slots 25. Thus the nut 12a will be gripped along the flats of the hardened disc springs 18.1a-18.4a facilitating the application and use of wrenching tools similar to conventional, solid nut constructions.

In order to hold the fingers 28a within the slots 25, the outer corners 27 of the slots 25 are skived or deformed slightly inwardly as at 27' to partially close the slots 25 whereby the fingers 28a will be retained therein.

Each of the fingers 28a is provided with an opening 50a located in alignment with the disc 18.3a. The openings 50a are selected to be of a size to permit access by the point of a punch such as shown in FIGS. 2 and 3 for the embodiment of FIGS. 1-4. Thus after the bore 24a of the nut structure 12a has been tapped the disc 18.3a can be struck by a pair of punches through openings 50a to permanently deform radially inwardly that portion of bore 24a defined by disc 18.3a. This will create distortions 56a in the thread in disc 18.3a to provide an initial preselected interference with the threads of the associated bolt upon which the nut and washer assembly 10a is to be installed. Since only two fingers 28a are used only two punches at opposite sides will be used to effectively provide the desired interference. Again, the outer end portions 31a of the fingers 28a clamp the disc springs 18.1a-18.4a against the ring portion 26a to preclude axial separation of the disc springs and axial distortion of the threads of the threaded bore 24 during the punching operation.

Next the nut structure 12a can be heat treated as discussed in conjunction with the embodiment of FIGS. 1-4 and, as noted there, a hardened or hardneable disc 18.3a could be used where a higher prevailing torque characteristic is desired.

As with the construction of FIGS. 1-4, the outer cage 16a is provided with a plurality of tabs 32a extending axially from the opening 30a at the bottom side 22a of the cage 16a.

Also, as with the construction of FIGS. 1-4, the washer 14a is generally flat with a generally circular shape. The construction and function of the tabs 32a and washer 14a are substantially the same as tabs 32 and washer 14 of FIGS. 1-4 and hence a detailed description thereof is omitted for purposes of simplicity.

While it will be apparent that the preferred embodiments of the invention disclosed are well calculated to fulfill the objects above stated, it will be appreciated that the invention is susceptible to modification, variation and change without departing from the proper scope or fair meaning of the invention. For example, while the present invention in the laminated nut structure is shown in combination of an assembly with a washer member, the feature of the present invention can be used with a laminated nut structure without such a washer structure.

What is claimed is:

1. A laminated nut structure for use with an associated threaded bolt portion for clamping workpieces together under a preselected clamp load comprising:

a plurality of conical spring disc washers, a cage receiving and holding said disc washers in a stacked, aligned relationship to define a central opening threaded to define a threaded bore, said cage including a ring portion and a plurality of axially extending fingers cooperating with said ring portion to hold said disc washers in said stacked, aligned relationship, selected ones of said disc washers being of a first preselected hardness, at least one of said disc washers being of a hardness substantially less than that of said selected ones of said disc washers, said one of said disc washers having that portion of said threaded bore defined by said one of said disc washers deformed to provide a preselected initial interference to threaded engagement with the threads of the associated bolt portion to provide an initial prevailing torque characteristic of a first magnitude resisting backing off from such bolt portion prior to clamping the workpieces together, said nut structure adapted to secure a plurality of workpieces together under the preselected clamp load in response to the application of a first magnitude of torque, said plurality of disc washers at least partially collapsing in response to said first magnitude of torque to provide a determinable locking force between said nut structure and the associated bolt portion, said one of said disc washers deforming permanently in response to said first magnitude of torque to provide a final prevailing torque characteristic of a second magnitude resisting backing off in the event of loosening of said nut structure and release of said locking force after such clamping of the workpieces.

2. The laminated nut structure of claim 1 with said second magnitude of said final prevailing torque characteristic being substantially greater than said first magnitude of said initial prevailing torque characteristic.

3. The laminated nut structure of claim 1 with said selected ones of said disc washers being formed of a thermally hardenable material and being heat treated to said first preselected hardness, said one of said disc washers being constructed of a material which is not susceptible to hardening in response to heat treatment for hardening said selected ones of said disc washers.

4. The laminated nut structure of claim 1 with said one of said disc washers having a Rockwell hardness of generally around 125 Rb or less and with said selected ones of said disc washers having a Rockwell hardness of generally around 39 Rc to around 45 Rc.

5. The laminated nut structure of claim 1 with said one of said disc washers being spaced axially from the leading end of said nut structure whereby a different one of said disc washers will be threaded onto the threads of the associated bolt portion substantially without thread interference and before the threaded engagement of said one of said disc washers whereby the initial threading of said nut structure onto the bolt portion will be facilitated.

6. A laminated nut structure comprising:

a plurality of conical spring disc washers, a cage receiving and holding said disc washers in a stacked, aligned relationship to define a central opening threaded to define a threaded bore, said cage including a ring portion and a plurality of axially extending fingers cooperating with said ring portion to hold said disc washers in said stacked, aligned relationship, selected ones of said disc washers defining generally undistorted portions of said threaded bore, said selected ones of said disc washers being of a preselected hardness, at least one of said disc washers being of a hardness substantially less than that of said selected ones of said disc washers, said one of said disc washers having that portion of said threaded bore defined by said one of said disc washers deformed to provide a preselected initial interference to threaded engagement with the threads of an associated bolt portion to provide a first prevailing torque characteristic resisting backing off from such bolt portion, at least one of said fingers having an opening radially in line with said one of said disc washers to provide access to said one of said disc washers for a tool to engage and deform said one of said disc washers to provide said preselected initial interference.

7. The laminated nut structure of claim 6 with said selected ones of said disc washers being formed of a ferrous material and being heat treated to said preselected hardness, said one of said disc washers being constructed of a material which is not susceptible to hardening in response to heat treatment for hardening said selected ones of said disc washers.

8. The laminated nut structure of claim 6 with said one of said disc washers having a Rockwell hardness of generally around 125 Rb or less and with said selected ones of said disc washers having a Rockwell hardness of generally around 39 Rc to around 45 Rc.

9. The laminated nut structure of claim 6 with said one of said disc washers being spaced axially from the leading end of said nut structure whereby a different one of said disc washers will be threaded onto the threads of the associated bolt portion substantially without threaded interference and before the threaded engagement of said one of said disc washers whereby the initial threading of said nut structure onto the bolt portion will be facilitated.

10. The laminated nut structure of claim 6 with said nut structure adapted to secure a plurality of workpieces together under a preselected clamp in response to the application of a first magnitude of torque, said plurality of disc washers at least partially collapsing in response to said first magnitude of torque to provide a determinable locking force between said nut structure and the associated bolt portion, said one of said disc washers deforming permanently in response to said first magnitude of torque to provide a final prevailing torque characteristic of a second magnitude resisting backing off.

11. The laminated nut structure of claim 10 with said second magnitude of said final prevailing torque characteristic being substantially greater than said first magnitude of said initial prevailing torque characteristic.

12. A laminated nut structure comprising:

a plurality of conical spring disc washers, a cage receiving and holding said disc washers in a stacked, aligned relationship to define a central opening threaded to define a threaded bore, said cage including a ring portion and a plurality of axially extending fingers cooperating with said ring portion to hold said disc washers in said stacked, aligned relationship, selected ones of said disc washers defining generally undistorted portions of said threaded bore, at least one of said disc washers having that portion of said threaded bore defined by said one of said disc washers distorted to provide a preselected initial interference to threaded engagement with the threads of an associated bolt portion to provide a prevailing torque characteristic resisting backing off from such bolt portion, said spring disc washers having a plurality of circumferentially disposed flats, axially extending slots located in said flats, said fingers located in said slots.

13. The laminated nut of claim 12 with said spring disc washers having two slots located in diametrically opposed flats and with said cage having two fingers located in said slots.

14. The laminated nut of claim 12 with said spring disc washers having at least two slots located in different ones of said flats and with said cage having said fingers located in said slots.

15. The laminated nut of claim 12 with said fingers having radially inwardly bent tab portions overengaging the adjacent one of said spring disc washers whereby said spring disc washers are clamped within said cage to inhibit axial separation.

16. A laminated nut structure for use with an associated threaded bolt portion for clamping workpieces together under a preselected clamp load comprising:

a plurality of conical spring disc washers, a cage receiving and holding said disc washers in a stacked, aligned relationship to define a central opening threaded to define a threaded bore, said cage including a ring portion and a plurality of axially extending fingers cooperating with said ring portion to hold said disc washers in said stacked, aligned relationship, selected ones of said disc washers defining generally undistorted portions of said threaded bore, at least one of said disc washers having that portion of said threaded bore defined by said one of said disc washers deformed to provide a preselected initial interference to threaded engagement with the threads of the associated bolt portion to provide an initial prevailing torque characteristic of a first magnitude resisting backing off from such bolt portion prior to clamping the workpieces together, said nut structure adapted to secure a plurality of workpieces together under the preselected clamp load in response to the application of a first magnitude of torque, said plurality of disc washers at least partially collapsing in response to said first magnitude of torque to provide a determinable locking force between said nut structure and the associated bolt portion, said one of said disc washers deforming permanently in response to said first magnitude of torque to provide a final prevailing torque characteristic of a second magnitude resisting backing off in the event of loosening of said nut structure and release of said locking force after such clamping of the workpieces.

17. The laminated nut structure of claim 16 with said second magnitude of said final prevailing torque characteristic being substantially greater than said first magnitude of said initial prevailing torque characteristic.

18. The laminated nut structure of claim 16 with said selected ones of said disc washers being formed of a ferrous material and being heat treated to said first preselected hardness, said one of said disc washers being constructed of a material which is not susceptible to hardening in response to heat treatment for hardening said selected ones of said disc washers.

19. The laminated nut structure of claim 16 with said one of said disc washers being spaced axially from the leading end of said nut structure whereby a different one of said disc washers will be threaded onto the threads of the associated bolt portion substantially without thread interference and before the threaded engagement of said one of said disc washers whereby the initial threading of said nut structure onto the bolt portion will be facilitated.

20. A laminated nut structure comprising:

a plurality of conical spring disc washers, a cage receiving and holding said disc washers in a stacked, aligned relationship to define a central opening threaded to define a threaded bore, said cage including a ring portion and a plurality of axially extending fingers cooperating with said ring portion to hold said disc washers in said stacked, aligned relationship, selected ones of said disc washers defining generally undistorted portions of said threaded bore, at least one of said disc washers having that portion of said threaded bore defined by said one of said disc washers deformed to provide a preselected initial interference to threaded engagement with the threads of an associated bolt portion to provide a first prevailing torque characteristic resisting backing off from such bolt portion, at least one of said fingers having an opening radially in line with said one of said disc washers to provide access to said one of said disc washers for a tool to engage and deform said one of said disc washers to provide said preselected initial interference.

21. The laminated nut structure of claim 20 with said selected ones of said disc washers being formed of a thermally hardenable material and being heat treated to said first preselected hardness, said one of said disc washers being constructed of a material which is not susceptible to hardening in response to heat treatment for hardening said selected ones of said disc washers.

22. The laminated nut structure of claim 20 with said one of said disc washers being spaced axially from the leading end of said nut structure whereby a different one of said disc washers will be threaded onto the threads of the associated bolt portion substantially without threaded interference and before the threaded engagement of said one of said disc washers whereby the initial threading of said nut structure onto the bolt portion will be facilitated.

23. The laminated nut structure of claim 20 with said nut structure adapted to secure a plurality of workpieces together under a preselected clamp in response to the application of a first magnitude of torque, said plurality of disc washers at least partially collapsing in response to said first magnitude of torque to provide a determinable locking force between said nut structure and the associated bolt portion, said one of said disc washers deforming permanently in response to said first magnitude of torque to provide a final prevailing torque characteristic of a second magnitude resisting backing off.

24. The laminated nut structure of claim 20 with said second magnitude of said final prevailing torque characteristic being substantially greater than said first magnitude of said initial prevailing torque characteristic.

* * * * *

UNITED STATES PATENT AND TRADEMARK OFFICE
CERTIFICATE OF CORRECTION

| | |
|---|---|
| PATENT NO. : | 5,049,017 |
| DATED : | September 17, 1991 |
| INVENTOR(S) : | Richard L. Reynolds |

It is certified that error appears in the above-identified patent and that said Letters Patent is hereby corrected as shown below:

Column 2, line 36, delete --,658-- and substitute therefor --'658--.

Column 4, line 22, delete "18 1" and substitute therefor --18.1--.

Signed and Sealed this

Tenth Day of August, 1993

Attest:

MICHAEL K. KIRK

*Attesting Officer*   Acting Commissioner of Patents and Trademarks